United States Patent [19]

Shinozaki et al.

[11] Patent Number: 5,112,511

[45] Date of Patent: * May 12, 1992

[54] ELECTROLYTE FOR ELECTROLYTIC CAPACITOR

[75] Inventors: Fumihiko Shinozaki; Yutaka Yokoyama, both of Ome, Japan

[73] Assignee: Nippon Chemi-Con Corporation, Tokyo, Japan

[*] Notice: The portion of the term of this patent subsequent to Jun. 2, 2004 has been disclaimed.

[21] Appl. No.: 917,637

[22] Filed: Oct. 10, 1986

[30] Foreign Application Priority Data

Dec. 28, 1985 [JP] Japan .................. 60-293660
Dec. 28, 1985 [JP] Japan .................. 60-293661

[51] Int. Cl.$^5$ ............................... H01G 4/04
[52] U.S. Cl. ..................... 252/62.2; 361/505
[58] Field of Search ............... 252/62.2; 546/347, 22; 548/413; 361/505; 564/15

[56] References Cited

U.S. PATENT DOCUMENTS

| | | | |
|---|---|---|---|
| 2,732,350 | 1/1956 | Clarke | 546/347 |
| 4,321,114 | 3/1982 | MacDiarmid | 429/199 |
| 4,670,175 | 6/1987 | Shinozaki | 252/62.2 |
| 4,710,310 | 12/1987 | Shinozaki | 252/62.2 |
| 4,762,631 | 8/1988 | Shinozaki | 252/62.2 |
| 4,762,633 | 8/1988 | Shinozaki | 252/62.2 |
| 4,810,400 | 8/1989 | Shinozaki | 252/62.2 |

OTHER PUBLICATIONS

Jain & Lal, "Electrolytic Reduction of Oxygen at Solid Electrodes in Aprotic Solvents-The Superoxide Ion", Electrochimica Acta, vol. 27, No. 6, pp. 759-763, 1982.

*Primary Examiner*—Prince Willis, Jr.
*Assistant Examiner*—Thomas Steinberg
*Attorney, Agent, or Firm*—Young & Thompson

[57] ABSTRACT

An electrolyte for electrolytic capacitors containing within an aprotic solvent a hexafluorophosphate of an organic amine compound as solute; wherein said organic amine compound is a compound containing one or two pyridine rings; or a primary, secondary or tertiary amine.

6 Claims, No Drawings

ELECTROLYTE FOR ELECTROLYTIC CAPACITOR

An electrolyte for electrolytic capacitor containing within an aprotic solvent a hexafluorophosphate salt of an organic amine compound as solute. An electrolyte for electrolytic capacitor according to the invention may conveniently be prepared by adding to an aqueous solution of hexafluorophosphate an equivalent amount of organic amine compound for reaction with subsequent reduction and dryness to obtain an anhydrous salt which as an approximately 10% by weight solution is then added to the aprotic solvent to prepare the resultant electrolyte.

FIELD OF THE INVENTION

This invention relates to an electrolyte for electrolytic capacitors containing within an aprotic solvent a hexafluorophosphate salt of an organic amine compound as solute.

BACKGROUND OF THE INVENTION

Hitherto, organic acids or salts thereof and glycol series pastes have been principally used as electrolytes for electrolytic capacitors in the general purposes. The latest expansion of utilization for electronic instruments requires more improvement and advancement in the reliability and performance of the capacitor entailing undesired problem of the presence of water in the paste and as a result an electrolyte using an aprotic solvent in place of organic acid and salts thereof and glycol paste has come to receive attention.

The greatest subject of employment of the aprotic solvent system electrolyte is how to obtain an electrolyte of high conductivity and to acheive this an organic carboxylic acid or its salt which is readily soluble in the aprotic solvent and has a high degree of dissociation has been researched as a main work but not yet succeeded. To solve the matter and obtain a high conductivity a solvent which produces water resulting from the reaction between acids and alcohols or glycols and even water is incorporated into the aprotic solvent with still insufficient conductivity, increments of water and solute contents with poor reliability at the elevated temperature as disclosed in the Japanese patent publications No. 55-3989, 57-56763, 58-32769 and the U.S. Pat. No. 4,117,531.

After extensive researches and studies to obtain an electrolyte which is a substantially nonaqueous system electrolyte and has a high conductivity with use of an aprotic solvent but without using any solvent which forms water in reaction between acids and alcohols with glycols, it has been discovered that an organic amine salt of hexafluorophosphate has a high solubility in the aprotic solvent with an enhanced releasability and provides a high conductivity.

SUMMARY OF THE INVENTION

Thus, a principal object of the invention is to provide an electrolyte of substantially non water series high conductivity, using an aprotic solvent.

An electrolyte for electrolytic capacitor according to the invention is characterized by containing a hexafluorophosphate salt of an organic amine compound in the aprotic solvent as solute.

PREFERRED EMBODIMENTS OF THE INVENTION

The organic amine compounds according to the invention are preferably selected from the compound groups containing one or two pyridine rings as described hereinafter.

(1) Pyridine compounds in which one or more hydrogen atoms bonded to the pyridine carbon are replaced by alkyl group, alkenyl group having 1 to 15 carbons, aryl group having 6 to 15 carbons or halogen:

α-picoline, β-picoline, γ-picoline, 2-ethylpyridine, 3-ethylpyridine, 4-ethylpyridine, 2-n-propylpyridine, 2-iso-propylpyridine, 2-n-octylpyridine, 2-vinylpyridine, 2-hexene-2-pyridine, 2-geranylpyridine, 2,3-dimethyl-pyridine, 2,6-dimethylpyridine, 3,4-dimethylpyridine, 3-ethyl-4-methylpyridine, 4-ethyl-2-methylpyridine, 6-ethyl-2-methylpyridine, 2,3,4-trimethylpyridine, 2,3,6-tri-methylpyridine, 2,4,5-trimethylpyridine, 2,4,6-trimethylpyridine, 2-ethyl-3,5-dimethylpyridine, 2-phenylpyridine, 4-tolylpyridine, 4-mesitylpyridine, 3-chloropyridine, 3,5-dibromopyridine.

(2) Dipyridine compounds:
2,2-diethyl-4,4-dipyridine, 4,4-dimethyl-2,2-dipyridine.

(3) Compounds in which two pyridine rings are bonded by an alkylene group having 1 to 8 carbons or an alkenylene group having 2 to 8 carbons:

1,3-di-(4-pyridine)-propane, 1,2-di-(4-pyridyl)-ethane 1,2-di-(4-pyridyl)-ethylene, 1,6-di-(4-pyridyl)-hexylene-3.

(4) Quatenary ammonium compounds in which to one nitrogen atom of pyridine are bonded an alkyl group, an alkenyl group having 1 to 15 carbons or an aryl group having 6 to 15 carbons:

N-ethyl-2-bromopyridine, N-vinyl 3,5-dimethylpyridine, N-phenyl-4-ethylpyridine, N-tolyl-4-butylpyridine.

Further, the organic amine compound according to the invention may preferably be selected from primary, secondary tertiary amines and quaternary ammonium compounds in which to one nitrogen atom are added 1 to 4 alkyl groups, alkenyl group having 1 to 15 carbons or aryl group having 6 to 15 carbons and 1 to 3 hydrogen atoms.

(1) Primary amines:
methylamine, ethylamine, propylamine, iso-propylamine, butylamine, amylamine, hexylamine, vinylamine, geranylamine, aniline, benzylamine.

(2) Secondary amines:
dimethylamine, diethylamine, dipropylamine, diisopropylamine, divinylamine, digeranylamine, diphenylamine, ditolylamine, N-methyl.benzylamine.

(3) Tertiary amines:
trimethylamine, triethylamine, tripropylamine, tributyl-amine, trivinylamine, trigeranylamine, triphenylamine, n-dimethyl.benzylamine.

(4) Quaternary ammonium compounds:
tetramethylammonium, n-butylammonium, vinyl trimethylammonium, phenylammonium, phenyltrimethylammonium, tolyltriethylammonium, benzyltrimethylammonium.

Moreover, the organic amine compound according to the invention may be preferably selected from the carbon of a hexafluorophosphate salt having a general formula,

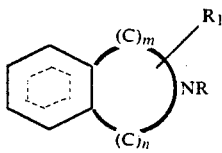

in which m is 0 or 1, m+n is 2 or 3, $R_1$ is presence or nonpresence of alkyl substituent having 1 to 3 carbon atoms, R is hydrogen or N-heterocyclic-di-condensed ring compound in which a nitrogen atom forms a tertiary amine or a quaternary ammonium with one or two alkyl groups having 1 to 5 carbon atoms and 0 to 5 conjugated double bonds are contained in the ring:

N-heterocyclic-di-condensed ring compound may be selected from quinoline, 2-methylquinoline(quinaldine), isoquinoline, and their partial hydrogenated compound or complete hydrogenated compound and, as those compounds, N-alkylates, indole, 3-methylindole(-skatol), isoindole, pseudoindole, their partial or complete hydrogenated compound and, as those compounds, N-alkyl compounds.

The aprotic solvent to be used in the invention may be selected from the followings but not limited thereto :

(1) Amide system solvent:
N-methylformamide, N-dimethylformamide, N-ethylformamide, N-diethylformamide, N-methylacetoamide, N-dimethylacetoamide, N-ethylacetoamide, N-diethylacetoamide, hexamethylphosphorinamide (2) Oxide compounds:
di-methylsulfoxide (3) Nitrile compounds:
acetonitrile (4) Cyclic esters, cyclic amides:
γ-butyrolactone, N-methyl-2-pyrrolidone, ethylenecarbonate, propylenecarbonate.

An electrolyte for electrolytic capacitor according to the invention may conveniently be prepared by adding to an aqueous solution of hexafluorophosphate an equivalent amount of organic amine compound for reaction with subsequent reduction and dryness to obtain an anhydrous salt which as an approximately 10% by weight solution is then added to the aprotic solvent to prepare the resultant electrolyte.

EXAMPLES 1 to 12

An electrolyte for electrolytic capacitor according to the invention will be exemplified in the followings with 10% by weight solution for the hexafluorophosphate salt of various organic amine compounds with respect to the conductivity and the fire voltage as shown in Table 1.

TABLE 1

| Example | Organic Amine Compounds hexafluorophosphate | Aprotic Solvent | Conductivity (ms/cm) |
|---|---|---|---|
| 1 | 2.6-dimethylpyridine hexafluorophosphate | N-dimethyl-formamide | 13.2 |
| 2 | 4,4'-dimethyl-2,2'-dipyridyl hexafluorophosphate | propylene carbonate | 6.9 |
| 3 | 1,2-di-(4-pyridyl)-ethylene hexafluorophosphate | N-ethylformamide | 13.8 |
| 4 | 4-tolyl-pyridine hexafluorophosphate | N-dimethyl-acetoamide | 12.2 |

TABLE 1-continued

| | Organic Amine Compounds hexafluorophosphate | Aprotic Solvent | Conductivity (ms/cm) |
|---|---|---|---|
| 5 | N-ethyl-2-bromo-pyridine hexafluorophosphate 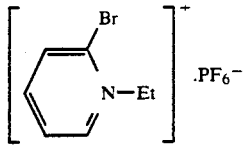 | N-methyl-2-pyrrolidone | 9.7 |
| 6 | N-phenyl-4-ethyl-pyridine hexafluorophosphate 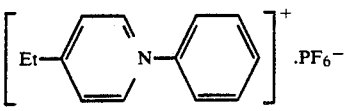 | dimethyl-sulfoxide | 11.6 |
| 7 | tributylamine hexafluorophosphate 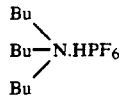 | ethylene-carbonate | 6.8 |
| 8 | diphenylamine hexafluorophosphate 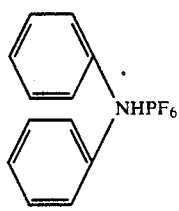 | hexamethyl phosphorinamide | 6.8 |
| 9 | geranylamine hexafluorophosphate 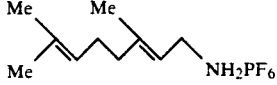 | acetonitrile | 11.8 |
| 10 | n-butyl-ammonium hexafluorophosphate 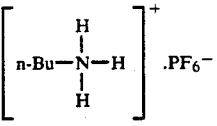 | γ-butyrolactone | 7.1 |
| 11 | vinyltrimethyl ammonium hexafluorophosphate 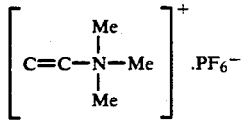 | N-methylaceto-amide | 9.9 |
| 12 | phenyltri-methyl-ammonium hexafluorophosphate 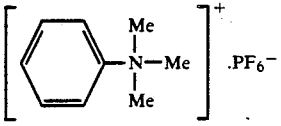 | N-methylform amide | 10.4 |

TABLE 1-continued

|  | Organic Amine Compounds hexafluorophosphate | | Aprotic Solvent | Conductivity (ms/cm) |
|---|---|---|---|---|
| Ref. | ethyleneglycol | 78% by weight | | 6.7 |
|  | water | 12% by weight | | |
|  | ammonium adipate | 10% by weight | | |

N. B.) In formula Me is methyl, Et is ethyl, Bu is butyl.

Substantial results obtained at 25 V 1 micro F for electrolytes exemplified in examples 1 to 12 are shown in Table 2.

TABLE 2

| Example | Initial Value | | | 110 deg. C. 1000 hours | | |
|---|---|---|---|---|---|---|
|  | Capacity ($\mu$F) | tan$\delta$ (%) | Leakage Current ($\mu$A/ 3 mins.) | Capacity ($\mu$F) | tan$\delta$ (%) | Leakage Current ($\mu$A/ 3 mins.) |
| 1 | 1.04 | 0.017 | 0.41 | 0.99 | 0.032 | 0.04 |
| 2 | 1.01 | 0.051 | 0.37 | 1.99 | 0.063 | 0.05 |
| 3 | 1.04 | 0.017 | 0.38 | 1.02 | 0.021 | 0.05 |
| 4 | 1.04 | 0.019 | 0.40 | 1.01 | 0.033 | 0.03 |
| 5 | 1.03 | 0.029 | 0.35 | 0.97 | 0.040 | 0.06 |
| 6 | 1.04 | 0.021 | 0.38 | 1.01 | 0.029 | 0.04 |
| 7 | 1.01 | 0.053 | 0.33 | 0.95 | 0.059 | 0.05 |
| 8 | 1.01 | 0.052 | 0.31 | 0.96 | 0.061 | 0.07 |
| 9 | 1.03 | 0.020 | 0.36 | 0.98 | 0.044 | 0.05 |
| 10 | 1.01 | 0.050 | 0.35 | 1.00 | 0.063 | 0.04 |
| 11 | 1.03 | 0.023 | 0.40 | 0.99 | 0.042 | 0.04 |
| 12 | 1.03 | 0.037 | 0.37 | 1.01 | 0.031 | 0.06 |
| (Ref.) | 1.01 | 0.055 | 0.42 | 0.92 | 0.078 | 0.08 |

EXAMPLES 13 TO 24

An electrolyte for electrolytic capacitor according to the invention will be exemplified in the followings with 10% by weight solution for the hexafluorophosphate salt of various N-heterocyclic-di-condensed ring compound with respect to the conductivity and the fire voltage as shown in Table 3.

Further, as comparative examples the conventional standard electrolytes composed of 78% by weight of ethyleneglycol, 12% by weight of water and 10% by weight of ammonium adipate are shown in Table 3.

TABLE 3

| Example | N-heterocyclic-di- condensed ring hexafluorophosphate | Aprotic Solvent | Conductivity (mS/cm) |
|---|---|---|---|
| 13 | quinoline hexafluorophosphate 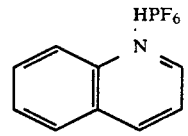 | N-dimethyl- formamide | 9.9 |
| 14 | quinaldine hexafluorophosphate 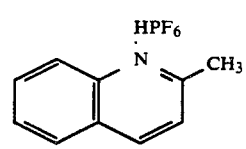 | propylene- carbonate | 7.9 |
| 15 | 1,2,3,4-tetra-hydroquinoline- hexafluorophosphate 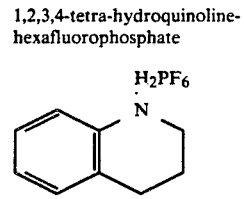 | N-ethylform- amide | 10.4 |

TABLE 3-continued

| | N-heterocyclic-di-condensed ring hexafluorophosphate | Aprotic Solvent | Conductivity (mS/cm) |
|---|---|---|---|
| 16 | hexafluorophosphoric-acid diethyldecahydroquinolinium | N-dimethyl-acetoamide | 9.7 |
| 17 | hexafluorophosphoric-acid methylquinolinium | N-methyl-2-pyrrolidone | 11.3 |
| 18 | isoquinoline hexafluoroborate | -butyrolactone | 9.4 |
| 19 | indole hexafluorophosphate | ethylene-carbonate | 6.7 |
| 20 | skatol hexafluorophosphate | hexamethyl-phosphorinamide | 6.8 |
| 21 | 2,3-dihydroindole hexafluorophosphate | acetonitrile | 11.8 |
| 22 | hexafluorophosphoric propylindolinium | dimethyl-sulfoxide | 7.9 |
| 23 | isoindole hexafluorophosphate | N-methylaceto-amide | 9.8 |

TABLE 3-continued

| | N-heterocyclic-di-condensed ring hexafluorophosphate | Aprotic Solvent | Conductivity (mS/cm) |
|---|---|---|---|
| 24 | pseudoindole hexafluorophosphate 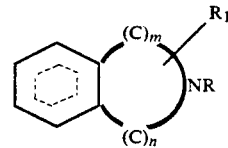 | N-methylformamide | 8.3 |
| Ref. | ethyleneglycol water ammonium adipate | 78% by weight 12% by weight 10% by weight | 6.7 |

The life characteristics of electrolytes as exemplified in Examples 13 to 24 and the comparative example are shown in Table 4.

TABLE 4

| | Initial Value | | | 110 deg. C. 1000 hours | | |
|---|---|---|---|---|---|---|
| Example | Capacity (μF) | tanδ (%) | Leakage Current (μA/ 3 mins.) | Capacity (μF) | tanδ (%) | Leakage Current (μA/ 3 mins.) |
| 13 | 1.03 | 0.027 | 0.37 | 1.01 | 0.036 | 0.03 |
| 14 | 1.01 | 0.041 | 0.41 | 0.96 | 0.052 | 0.05 |
| 15 | 1.02 | 0.025 | 0.35 | 1.01 | 0.027 | 0.05 |
| 16 | 1.02 | 0.028 | 0.36 | 0.99 | 0.041 | 0.05 |
| 17 | 1.04 | 0.022 | 0.39 | 0.99 | 0.047 | 0.04 |
| 18 | 1.02 | 0.033 | 0.39 | 0.98 | 0.037 | 0.03 |
| 19 | 1.01 | 0.053 | 0.37 | 0.99 | 0.058 | 0.04 |
| 20 | 1.01 | 0.053 | 0.35 | 0.96 | 0.062 | 0.04 |
| 21 | 1.04 | 0.020 | 0.37 | 0.98 | 0.045 | 0.04 |
| 22 | 1.01 | 0.041 | 0.33 | 0.98 | 0.049 | 0.03 |
| 23 | 1.03 | 0.029 | 0.38 | 0.99 | 0.042 | 0.05 |
| 24 | 1.02 | 0.038 | 0.35 | 1.01 | 0.043 | 0.05 |
| Ref. | 1.01 | 0.055 | 0.42 | 0.92 | 0.078 | 0.08 |

The electrolyte according to the invention may provide a non water series electrolyte having a high conductivity equivalent to or more than the conductivity of the conventional electrolyte composed of glycols, water and organic acid salt with improved and wide applicability in the design of electrolytic capacitors.

What is claimed is:

1. An electrolyte for electrolytic capacitors containing within an aprotic solvent a hexafluorophosphate of an organic amine compound as solute; wherein said organic amine compound is a compound containing one or two pyridine rings; or a primary, secondary, or tertiary amine; or a quaternary ammonium compound in which to a nitrogen atom is bonded 1 to 4 alkyl, alkenyl or aryl groups and 1 to 3 hydrogen atoms.

2. An electrolyte for electrolytic capacitor according to claim 1, wherein said compound containing one or two pyridine rings is a compound in which one or more hydrogen atoms bonded to the carbon of pyridine ring are replaced by alkyl group, alkenyl group, aryl group or halogen.

3. An electrolyte for electrolytic capacitor according to claim 1, wherein said compound containing two pyridine rings includes a dipyridyl compound or a compound in which two pyridine rings are bonded by alkylene group of 1 to 8 carbons or alkenylene group of 2 to 8 carbons.

4. An electrolyte for electrolytic capacitor according to claim 1, said electrolyte contains additionally a quaternary ammonium compound in which to a nitrogen atom of a pyridine ring is added one alkyl group, alkenyl group or aryl group.

5. An electrolyte for electrolytic capacitor according to claim 1, wherein said organic amine compound is a compound of general formula, in which m is 0 or 1, m+n is 2 or 3, $R_1$ is presence or nonpresence of alkyl substituent having 1 to 3 carbon atoms, R is hydrogen or an N-heterocyclic-di-condensed ring compound in which a nitrogen atom forms a tertiary amine or a quaternary ammonium with one or two alkyl groups having 1 to 5 carbon atoms and 0 to 5 conjugated double bonds are contained in the ring.

6. An electrolyte for electrolytic capacitor according to claim 1, wherein the aprotic solvent is selected from the group consisting of N-methyformamide, N-dimethylformamide, N-ethylformamide, N-diethylformamide, N-methylacetamide, N-dimethylacetamide, N-ethylacetamide, N-diethylacetamide, γ-butyrolacetone, N-methyl-2-pyrrolidone, ethylene carbonate, propylene carbonate, dimethyl sulfoxide, acetonitrile and mixtures thereof.

* * * * *

UNITED STATES PATENT AND TRADEMARK OFFICE
CERTIFICATE OF CORRECTION

PATENT NO. : 5,112,511
DATED : May 12, 1992
INVENTOR(S) : Fumihiko Shinozaki et al.

It is certified that error appears in the above—identified patent and that said Letters Patent is hereby corrected as shown below:

Column 11, lines 51-53, delete "; or a quaternary ammonium compound in which to a nitrogen atom is bonded 1 to 4 alkyl, alkenyl or aryl groups and 1-3 hydrogen atoms".

Column 12, line 45, cancel "or a quaternary ammonium".

Signed and Sealed this

Twenty-eighth Day of June, 1994

Attest:

BRUCE LEHMAN

Attesting Officer   Commissioner of Patents and Trademarks